(12) United States Patent
Dielacher et al.

(10) Patent No.: US 12,717,010 B2
(45) Date of Patent: Aug. 25, 2026

(54) METHOD AND APPARATUS FOR CHARACTERIZING A TIME-OF-FLIGHT SENSOR AND/OR A COVER COVERING THE TIME-OF-FLIGHT SENSOR

(71) Applicant: Infineon Technologies AG, Neubiberg (DE)

(72) Inventors: Markus Dielacher, Graz (AT); Martin Flatscher, Graz (AT); Hannes Plank, Graz (AT); Armin Josef Schoenlieb, Seiersberg-Pirka (AT)

(73) Assignee: Infineon Technologies AG, Neubiberg (DE)

( * ) Notice: Subject to any disclaimer, the term of this patent is extended or adjusted under 35 U.S.C. 154(b) by 1483 days.

(21) Appl. No.: 17/339,472

(22) Filed: Jun. 4, 2021

(65) Prior Publication Data

US 2021/0382153 A1 Dec. 9, 2021

(30) Foreign Application Priority Data

Jun. 5, 2020 (EP) .................................... 20178553

(51) Int. Cl.

*G01S 7/497* (2006.01)
*G01S 7/481* (2006.01)
*G01S 7/4865* (2020.01)
*G01S 17/26* (2020.01)
*G01S 17/894* (2020.01)

(52) U.S. Cl.

CPC ............ *G01S 7/497* (2013.01); *G01S 7/4813* (2013.01); *G01S 7/4865* (2013.01); *G01S 17/26* (2020.01); *G01S 17/894* (2020.01)

(58) Field of Classification Search

CPC ...... G01S 7/497; G01S 7/4813; G01S 7/4865; G01S 17/26; G01S 17/894; G01S 2007/4975; G01S 7/487; G01S 7/4811; G01S 7/493

See application file for complete search history.

(56) References Cited

U.S. PATENT DOCUMENTS

2016/0124089 A1* 5/2016 Meinherz .............. G01S 17/894 356/5.01
2017/0038459 A1* 2/2017 Kubacki ................. G01S 17/36
(Continued)

FOREIGN PATENT DOCUMENTS

CN 104730536 A 6/2015
CN 105572681 A 5/2016
(Continued)

*Primary Examiner* — Yuqing Xiao
(74) *Attorney, Agent, or Firm* — Murphy, Bilak & Homiller, PLLC

(57) ABSTRACT

A method for characterizing a time-of-flight sensor and/or a cover covering the time-of-flight sensor is provided. The method includes performing at least one coded modulation measurement with the time-of-flight sensor for obtaining measurement data for light reflected from the cover back to the time-of-flight sensor. A measurement range of the time-of-flight sensor is configured to end shortly after the cover for the at least one coded modulation measurement. Further, the method includes determining characterization data based on the measurement data, wherein the characterization data indicate a quantity related to the time-of-flight sensor and/or the cover.

15 Claims, 2 Drawing Sheets

(56) References Cited

U.S. PATENT DOCUMENTS

| | | | | |
|---|---|---|---|---|
| 2017/0269209 | A1* | 9/2017 | Hall | G01S 17/10 |
| 2019/0094364 | A1* | 3/2019 | Fine | G01S 17/10 |
| 2020/0271765 | A1* | 8/2020 | Glover | G01S 7/4876 |
| 2020/0278426 | A1* | 9/2020 | Dummer | H01S 5/06203 |

FOREIGN PATENT DOCUMENTS

| | | | |
|---|---|---|---|
| CN | 111133329 | A | 5/2020 |
| DE | 10059093 | A1 | 6/2002 |
| DE | 102014111431 | A1 | 2/2016 |
| EP | 3460509 | A1 | 3/2019 |
| WO | 2012013760 | A1 | 2/2012 |
| WO | 2013104717 | A1 | 7/2013 |

* cited by examiner

METHOD AND APPARATUS FOR CHARACTERIZING A TIME-OF-FLIGHT SENSOR AND/OR A COVER COVERING THE TIME-OF-FLIGHT SENSOR

TECHNICAL FIELD

The present disclosure relates to Time-of-Flight (ToF) sensing. In particular, examples relate to a method and an apparatus for characterizing a ToF sensor and/or a cover covering the ToF sensor.

BACKGROUND

A ToF module is conventionally covered by a cover glass in order to protect the ToF module from the environment. The cover glass may influence measurements of the ToF module. Further, various other characteristics such as temperature may influence the measurements of the ToF module.

Hence, there may be a demand for characterization of a ToF sensor and/or a cover covering a ToF sensor.

SUMMARY

The demand may be satisfied by the subject matter of the appended claims.

An example relates to a method for characterizing a ToF sensor and/or a cover covering the ToF sensor. The method comprises performing at least one coded modulation measurement with the ToF sensor for obtaining measurement data for light reflected from the cover back to the ToF sensor. A measurement range of the ToF sensor is configured to end shortly after the cover for the at least one coded modulation measurement. Further, the method comprises determining characterization data based on the measurement data. The characterization data indicate a quantity related to the ToF sensor and/or the cover.

Another example relates to an apparatus for characterizing a ToF sensor and/or a cover covering the ToF sensor. The apparatus comprises a ToF sensor configured to perform at least one coded modulation measurement for obtaining measurement data for light reflected from the cover back to the ToF sensor. A measurement range of the ToF sensor is configured to end shortly after the cover for the at least one coded modulation measurement. The apparatus further comprises a processing circuit configured to determine characterization data based on the measurement data. The characterization data indicate a quantity related to the ToF sensor and/or the cover.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
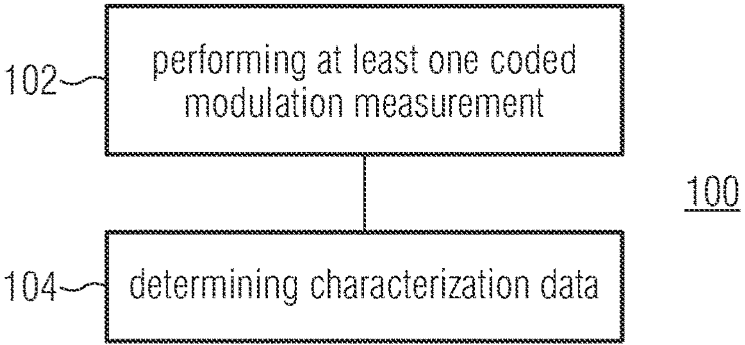
FIG. 1 illustrates a flowchart of an example of a method for characterizing a ToF sensor and/or a cover covering the ToF sensor.

FIG. 1 illustrates a flowchart of an example of a method 100 for characterizing a ToF sensor and/or a cover covering the ToF sensor. The method 100 will be described in the following further with reference to FIG. 2 which illustrates an exemplary arrangement of a ToF sensor 210 and a cover 220 covering the ToF sensor 210.

The method 100 comprises performing 102 at least one Coded Modulation (CM) measurement with the ToF sensor 210 for obtaining measurement data for light reflected from the cover 220 back to the ToF sensor 210. In general, any number of CM measurement may be performed. For example, exactly one (i.e. a single) CM measurement may be performed for obtaining the measurement data. In other examples, at least two, three, four or more CM measurements may be performed for obtaining the measurement data. In other words, the measurement of the cover 220 comprises one or several frames.

Figure 2:
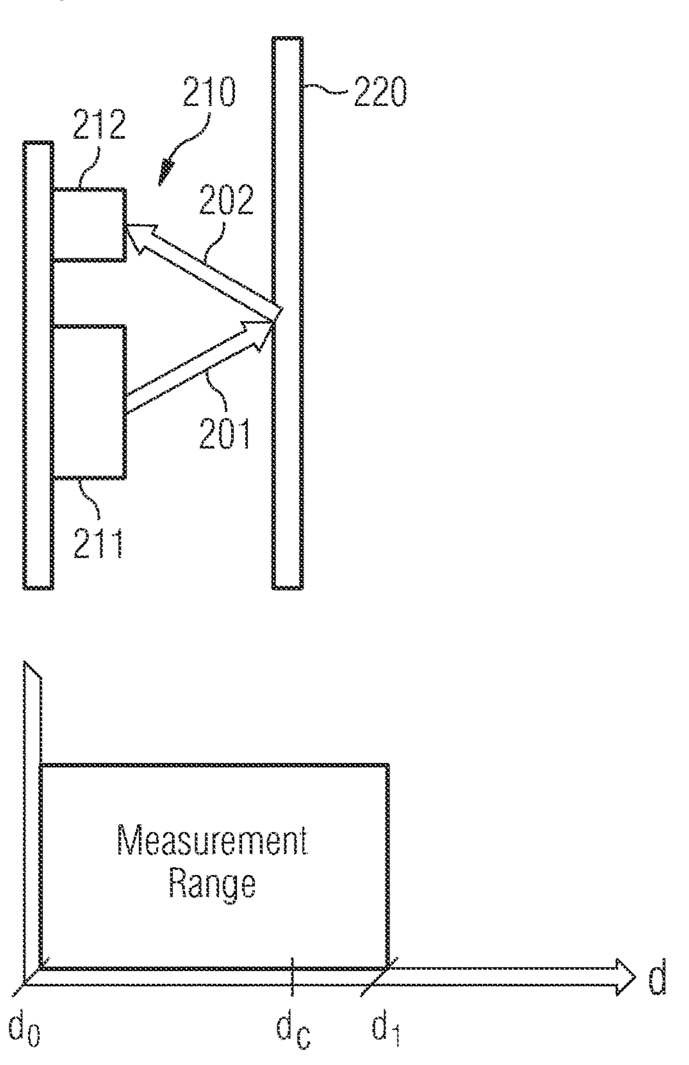
FIG. 2 illustrates an exemplary arrangement of a ToF sensor and a cover.

As can be seen from FIG. 2, light 201 is emitted by an illumination element 211 of the ToF sensor 210 in each CM measurement. The illumination element 211 generates the light 201 based on an illumination signal exhibiting an alternating series of high and low pulses of varying duration (length). Accordingly, the light 201 is a series of light pulses with varying pulse length and varying pulse spacing. For example, the illumination element 211 may comprise one or more Light-Emitting Diodes (LEDs) or one or more laser diodes (e.g. one or more Vertical-Cavity Surface-Emitting Lasers, VCSELs) which are fired based on the illumination signal.

The light 201 is reflected from the cover 220 back to the ToF sensor 210. In particular, the light 201 is reflected (at least in part) from the cover 220 towards a light capturing element 212 of the ToF sensor 210. The light 201 may be reflected at a surface of the cover 220 and/or inside (within) the cover 220. The reflected light is denoted by the reference sign 202 in FIG. 2. The reflected light 202 arrives at the ToF sensor 210 without leaving the module. The light capturing element 212 measures the reflected light 202. The light capturing element 212 may comprise various components such as e.g. optics (e.g. one or more lenses) and electronic circuitry. For example, the electronic circuitry may comprise an image sensor comprising a plurality of photo-sensitive elements or pixels (e.g. each comprising a Photonic Mixer Device, PMD) and driver electronics for the image sensor. All or only selected elements/pixels of the plurality of photo-sensitive elements/pixels may be used for measuring the reflected light 202. A reference signal is used for driving the electronic circuitry of the light capturing element 212 (e.g. the photo-sensitive elements or pixels) for measuring the reflected light 202. Similarly to what is described above for the illumination signal used for driving the illumination element 211, the reference signal exhibits an alternating series of high and low pulses of varying duration (length). It is to be noted that the illumination signal and the reference signal used for a CM measurement may be identical, time-shifted (phase-shifted) with respect to each and/or be different from each other. Further, if more than one CM measurement is performed, different illumination signals and/or reference signals may be used for the individual CM measurements.

Typically, the illumination element 211 and the light capturing element 212 are arranged in a common cavity that is (at least partly) covered by the cover 220 in order to protect the ToF sensor 210 from dust, moisture, dirt, etc. The cover 220 may, e.g., be made up of glass, plastics or any other suitable material. For example, the cover 220 may be a glass cover of a mobile phone or an automotive ToF system. In some examples, the cover 220 may be a display such as an OLED (Organic Light Emitting Diode) display or a micro LED display, or a part thereof. It is to be noted that the cover 220 may be any element that is capable of protecting the ToF sensor 210 from the surrounding environment and that is at least partially transparent for the modulated light 201 emitted by the illumination element 211.

A measurement range of the ToF sensor is configured to end shortly (e.g. immediately) after the cover for the at least one CM measurement according to method 100. This is exemplarily depicted in FIG. 2 illustrating the measurement range 213 of the ToF sensor 210. The measurement range 213 is the distance (depth) range in which the ToF sensor 210 is capable of sensing a distance of an object to the ToF sensor 210 based on the light reflected from the object back to the ToF sensor 210. In the example of FIG. 2, the measurement range 213 begins at a distance $d_0$ to the ToF sensor 210 and ends at a distance $d_1$ to the ToF sensor 210. The distance $d_1$ limiting the measurement range 213 shortly (e.g. immediately) follows the distance $d_c$ denoting the distance of the cover 220 to the ToF sensor 210. For example, the measurement range 213 of the ToF sensor 210 may end less than 50 cm, 30 cm, 10 cm, 5 cm, 1 cm or 5 mm after the cover 220 (i.e. the distance $d_1$ may differ by less than, e.g., 50 cm, 30 cm, 10 cm, 5 cm, 1 cm or 5 mm from the distance $d_c$).

The measurement range of the ToF sensor 210 for the at least one CM measurement may be adjusted by adjusting the pulse durations (lengths) of the high and low pulses in the illumination signal and/or the reference signal. Further, the measurement range of the ToF sensor 210 may be adjusted by adjusting a time-shift (phase shift) between the illumination signal and the reference signal. By using CM for the modulation of the light 201, the response of the ToF sensor 210 may be restricted to distances similar to the light path between the ToF sensor 210 and the cover 220. The modulation code(s) underlying the illumination signal and the reference signal may, e.g., be selected to have a steep slope in order to mitigate a response of the ToF sensor 210 to reflections of objects behind the cover 220. Accordingly, only light which is reflected by the cover 220 may be measured.

The ToF sensor 210 generates and outputs measurement data based on the light arriving at the light capturing element 212. Due to the restriction of the measurement range 213 of the ToF sensor 210, the ToF sensor is (substantially) only sensitive to the reflected light 202 arriving at the light capturing element 212 from the cover 220. Therefore, measurement data for (of) light reflected from the cover 220 back to the ToF sensor 210 is obtained for the at least one CM measurement.

The method 100 additionally comprises determining 104 characterization data based on the measurement data for the light reflected from the cover 220 back to the ToF sensor 210. The characterization data indicate a quantity related to the ToF sensor 210 and/or the cover 220.

The cover 220 is a known object with known reflectivity at a known, fixed distance to the ToF sensor 210. Accordingly, the light path of the light 201 to the cover 220 and back to the ToF sensor 210 has a fixed distance. Taking into account the knowledge about the cover 220, the reflected light 202 arriving at the light capturing element 212 from the cover 220 allows to characterize ToF sensor 210 and the cover 220. Hence, the method 100 may allow to characterize the ToF sensor 210 and/or the cover 200 by means of the characterization data derived from the measurement data for light reflected from the cover 220 back to the ToF sensor 210.

The characterization data may be of various types and may indicate various quantities related to the ToF sensor and/or the cover. In the following, some exemplary types of characterization data will be described in detail. However, it is to be noted that the present disclosure is not limited to the examples described in the following.

According to some examples, the characterization data indicate a distance error correction value for correcting distance values determined based on depth measurements performed by the ToF sensor 210. ToF sensors such as the ToF sensor 210 conventionally suffer from a distance (depth) measurement error (offset), which may depend on various factors such as a temperature or aging. For example, the generation of the illumination signal and the driver electronics operation is temperature dependent. Accordingly, the temperature may affect the indirect light path over the cover 220. The distance measurement error is to be compensated in order to obtain correct distance (depth) measurement results. As described in the following, the known path distance between the cover 220 and the ToF sensor 210 and the obtained measurement data enable to correct for this error.

To obtain the distance error correction value, determining 104 the characterization data comprises determining a measured distance of the cover 220 to the ToF sensor 210 based on the measurement data. In other words, the distance of the cover 220 to the ToF sensor 210 is measured via the at least one CM measurement. Further, determining 104 the characterization data comprises determining the distance error correction value based on a comparison of the measured distance of the cover 220 to the ToF sensor 210 to the known distance of the cover 220 to the ToF sensor 210. By comparing the measured distance of the cover 220 to the ToF sensor 210 to the known distance of the cover 220 to the ToF sensor 210, a discrepancy between the measured distance of the cover 220 to the ToF sensor 210 and the actual distance of the cover 220 to the ToF sensor 210 may be determined and the distance error correction value may be derived therefrom.

Assuming that a distance value is indicating a distance of the ToF sensor 210 to an object in a scene (not illustrated in FIG. 2) sensed by the ToF sensor 210 is determined based on one or more depth measurements performed by ToF sensor 210, the method 100 may further comprise correcting the distance value using the determined distance error correction value. For example, the distance error correction value may be a distance error correction offset which is added to or subtracted from the distance value, or the distance error correction value may be a factor which is multiplied with the distance value. Accordingly, the distance value suffering from the distance measurement error of the ToF sensor 210 may be corrected in order to provide an error corrected distance value.

For example, if the light capturing element 212 comprises a plurality of photo-sensitive elements or pixels, a respective distance error correction value may be determined for each or at least part of the plurality of photo-sensitive elements or pixels. In other words, the distance error correction value may be calculated based on a pixel-by-pixel basis.

In other examples, the characterization data indicate a measured output power of the illumination element 211. The output power of the illumination element 211 may depend on various factors such as a temperature or aging. The reflectivity of the cover 220 is assumed to be substantially constant. Accordingly, the reflected light 202 arriving at the light capturing element 212 is proportional to the output power of the illumination element 211. By digitizing the reflected light 202 arriving at the light capturing element 212, the current output power of the illumination element 211 may be measured. For example, if the output power of the illumination element 211 is drifting due to temperature variations, the drift in output power may be measured and be used as an input of a control system (controller) of the illumination element 211 in order to regulate the emitted optical power. Accordingly, a constant optical power output of the illumination element 211 may be achieved. For example, a constant optical power output of the illumination element 211 for different temperatures may be achieved. For example, the illumination signal for controlling the illumination element 211 may be generated based on the characterization data according to the method 100. By varying the illumination signal based on the characterization data, the output power of the illumination element 211 may be controlled. Similarly, duty cycle adaptation, pulse skipping or exposure time adaptation may be performed based on the characterization data in order to achieve a (substantially) constant average output power of the illumination element 211. For example, a control algorithm for controlling light emission by the illumination element 211 may receive the characterization data as input. Alternatively or additionally, the reference signal for driving the electronic circuitry of the light capturing element 212 may be generated based on the characterization data according to the method 100. By varying the reference signal based on the characterization data, the operation of the light capturing element 212 may be adapted to the measured output power of the illumination element 211.

In case the illumination element 211 comprises more than one light source (e.g. an LED or a VCSEL), the method 100 may be applied for each of the light sources separately in order to measure the output power of the light sources of the illumination element 211 separately. Accordingly, each of the light sources of the illumination element 211 may be controlled individually based on the respective measured output power.

In still other examples, the characterization data indicate a condition of the cover. Different conditions of the cover 220 affect the reflectivity of the cover 220 and may, hence, affect (influence) the light emission and/or reception characteristics of the ToF sensor 210. The reflectivity of the cover 220 is known for at least one specific condition of the cover 200. Accordingly, the reflected light 202 may be used to classify the condition of the cover. The condition of the cover 220 may, e.g., indicate at least one of the following: no foreign material present on the cover 220, presence of foreign material (e.g. dust, fluid drops) on the cover 220, presence of dirt on the cover 220, presence of one or more finger print marks on the cover 220, presence of fluid on the cover 220. For example, the presence of dirt on the cover 220 may influence the reflectivity of the cover such that the reflected light 202 exhibits a certain characteristic. Accordingly, the obtained measurement data for the at least one CM measurement while dirt is present on the cover 220 may exhibit a certain characteristic. By comparing the obtained measurement data for the at least one CM measurement while dirt is present on the cover 220 with reference data for one or more predefined conditions of the cover 220, the condition of the cover 220 may be determined.

In some examples, the method 100 may further comprise outputting characterization data to other circuitry (e.g. an application processor).

The method 100 may be used during operation of the ToF sensor 210. For example, the at least one CM measurement for obtaining the measurement data may be performed in a sequence of depth measurements for obtaining a depth image. Accordingly, the determined characterization data may be used in the process of the obtaining the depth image. For example, if the determined characterization data indicate a distance error correction value as described above, a distance value determined based on the sequence of depth measurements may be corrected using the distance error correction value in the process of the obtaining the depth image. Similarly, if the characterization data indicate a measured output power of the illumination element 211, the output power of the illumination element 211 during the sequence of depth measurements may be controlled based on the measured output power in order to achieve a (substantially) constant average output power of the illumination element 211 during the sequence of depth measurements. The at least one CM measurement for obtaining the measurement data may be performed at an arbitrary position in the sequence of depth measurements for obtaining a depth image.

In other examples, the at least one CM measurement for obtaining the measurement data may be performed sporadically, i.e. independent from performing in a sequence of depth measurements for obtaining a depth image. For example, the at least one CM measurement for obtaining the measurement data may be performed if there are no reflective objects in a scene sensed by the ToF sensor 210 which might affect the measurement(s). Accordingly, the method 100 may further comprise performing one or more depth measurements of a scene with the ToF sensor 210 and determining, based on the one or more depth measurements of the scene (e.g. based on the data obtained from the one or more depth measurements), whether any photo-sensitive element (pixel) of the light capturing element 212 that is (intended) to be used for the at least one CM measurement is receiving light reflected from any object in the scene back to the ToF sensor 210. (Only) If no photo-sensitive element (pixel) to be used for the at least one CM measurement is receiving light reflected from any object in the scene back to the ToF sensor 210, the at least one CM measurement for obtaining the measurement data is performed.

According to method 100, the characterization data may be stored in a (data) memory together with temperature data indicating a temperature at the ToF sensor 210 during the at least one CM measurement for obtaining the measurement data. The temperature at the ToF sensor 210 may, e.g., indicate the temperature at the illumination element 211, the light capturing element 212 or a sub-element thereof. For example, one or more temperature sensors may be arranged at the ToF sensor 210 for measuring the temperature and providing the temperature data. The characterization data may, e.g., be stored in the memory together with the temperature data during operation of the ToF sensor 210 or at a factory calibration. The memory may be a memory of the ToF sensor 210 or an external memory accessible for the ToF sensor 210.

In addition to the characterization data further pieces of characterization data may be stored in the memory. Each of the further pieces of characterization data may be stored together with a respective piece of temperature data indicating a temperature at the ToF sensor 210 different from the temperature during the at least one CM measurement for obtaining the measurement data. For example, multiple CM measurement may be done at different temperatures in order to obtain respective pieces of characterization data for different temperatures. Accordingly, the characterization data may serve as calibration data for different temperatures, i.e. be temperature dependent calibration data. For obtaining characterization data for a target (desired) temperature, the method 100 may comprise controlling the ToF sensor 210 to heat up to the target temperature (e.g. by controlling the ToF sensor 210 to continuously perform ToF measurements until the target temperature is reached), and to perform the at least one CM measurement for obtaining the measurement data once (after) the target temperature has been reached.

The stored temperature dependent calibration data may be used by the ToF sensor 210 for (e.g. regularly, repeatedly) adjusting its operation based on the current temperature. For example, the method 100 may comprise measuring a current temperature at the ToF sensor 210 (e.g. using the above described temperature sensor(s)). Further, the method 100 may comprise selecting one of the characterization data and the further pieces of characterization data based on a comparison of the current temperature and the temperatures indicated by the respective temperature information (i.e. the pieces of temperature data) stored in the memory together with the characterization data and the further pieces of characterization data. The method 100 may additionally comprise operating the ToF sensor 210 using the selected one of the characterization data and the further pieces of characterization data. For example, if the pieces of characterization data indicate for different temperatures a respective distance error correction value, a suitable distance error correction value for the current temperature may be selected based on a simple temperature measurement at the ToF sensor 210. Similarly, if the pieces of characterization data indicate for different temperatures a respective measured output power of the illumination element 211, suitable calibration data for the current temperature for controlling the illumination element 211 may be selected based on a simple temperature measurement at the ToF sensor 210. In other words, only the temperature may be measured at operation in order to select corresponding calibration data for error correction.

Further, a respective piece of characterization data stored in the memory together with a respective piece of temperature data may be updated with characterization data newly determined according to the method 100 for the same temperature as indicated by the stored piece of temperature data.

As described above for various examples, light reflected by the cover 220 may be used for system temperature compensation.

Figure 3:
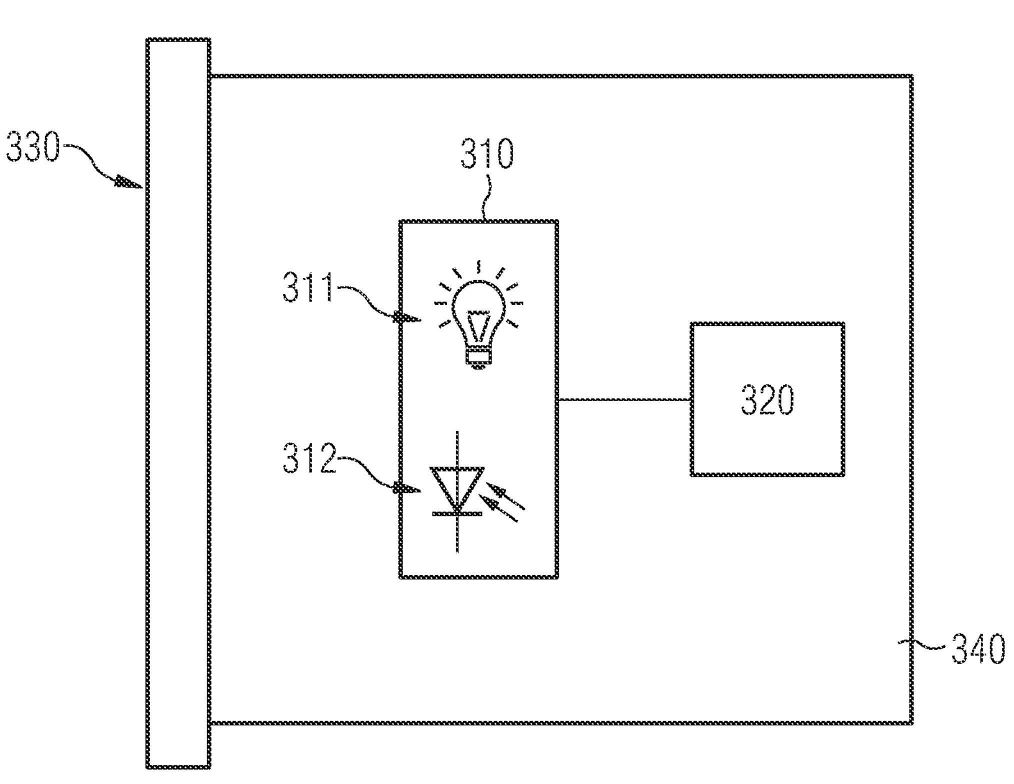
FIG. 3 illustrates an example of an apparatus for characterizing a ToF sensor and/or a cover covering the ToF sensor.

An example of an apparatus 300 for characterizing a ToF sensor and/or a cover covering the ToF sensor according to the proposed technique is further illustrated in FIG. 3. The apparatus 300 comprises a ToF sensor 310. The ToF sensor 310 comprises an illumination element 311 and a light capturing element 312 for performing ToF measurements according to the above described technique. The illumination element 311 and the light capturing element 312 are arranged in a common cavity 340 that is (at least in part) covered by a cover 330. In particular, the ToF sensor 310 is configured to perform at least one CM measurement for obtaining measurement data for light reflected from the cover 330 back to the ToF sensor 310. A measurement range of the ToF sensor 310 is configured to end shortly (e.g. immediately) after the cover 330 for the at least one CM measurement.

Further, the apparatus 300 comprises a processing circuit 320. For example, the processing circuit 320 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 320 may optionally be coupled to, e.g., read only memory (ROM) for storing software, random access memory (RAM) and/or non-volatile memory. The processing circuit 320 is configured to perform processing according to the above described technique. In particular, the processing circuit 320 is configured to determine characterization data based on the measurement data. The characterization data indicate a quantity related to the ToF sensor 310 and/or the cover 330.

The apparatus 300 may further comprise further hardware—conventional and/or custom.

The examples as described herein may be summarized as follows:

Some examples relate to a method for characterizing a ToF sensor and/or a cover covering the ToF sensor is provided. The method comprises performing at least one coded modulation measurement with the ToF sensor for obtaining measurement data for light reflected from the cover back to the ToF sensor. A measurement range of the ToF sensor is configured to end shortly after the cover for the at least one coded modulation measurement. Further, the method comprises determining characterization data based on the measurement data. The characterization data indicate a quantity related to the ToF sensor and/or the cover.

According to some examples, an illumination element of the ToF sensor for emitting the light and a light capturing element of the ToF sensor for measuring the light reflected from the cover are arranged in a common cavity that is covered by the cover.

In some examples, at least two coded modulation measurements are performed for obtaining the measurement data.

According to some examples, the characterization data indicate a distance error correction value for correcting distance values determined based on depth measurements performed by the ToF sensor, and determining the characterization data comprises: determining a measured distance of the cover to the ToF sensor based on the measurement data; and determining the distance error correction value based on a comparison of the measured distance of the cover to the ToF sensor to a known distance of the cover to the ToF sensor.

In some examples, the method further comprises correcting, using the distance error correction value, a distance value indicating a distance of the ToF sensor to an object in a scene sensed by the ToF sensor, wherein the distance value is determined based on depth measurements performed by the ToF sensor.

According to some examples, the characterization data indicate a measured output power of an illumination element of the ToF sensor for emitting the light.

In some examples, the method further comprises: generating, based on the characterization data, an illumination signal for controlling the illumination element of the ToF sensor; and/or generating, based on the characterization data, a reference signal for driving electronic circuitry of a light capturing element of the ToF sensor for measuring the light reflected from the cover.

According to some examples, the characterization data indicate a condition of the cover.

In some examples, the condition of the cover indicates at least one of the following: no foreign material present on the cover, presence of foreign material on the cover, presence of dirt on the cover, presence of a finger print mark on the cover, presence of fluid on the cover.

According to some examples, the method further comprises storing the characterization data in a memory together with temperature data indicating a temperature at the ToF sensor during the at least one coded modulation measurement for obtaining the measurement data.

In some examples, in addition to the characterization data further pieces of characterization data are stored in the memory, wherein each of the further pieces of characterization data is stored together with a respective piece of temperature data indicating a temperature at the ToF sensor different from the temperature during the at least one coded modulation measurement for obtaining the measurement data, and wherein the method further comprises: measuring a current temperature at the ToF sensor; selecting one of the characterization data and the further pieces of characterization data based on a comparison of the current temperature and the temperatures indicated by the pieces of temperature data stored in the memory together with the characterization data and the further pieces of characterization data; and operating the ToF sensor using the selected one of the characterization data and the further pieces of characterization data.

According to some examples, the ToF sensor comprises a light capturing element for measuring the light reflected from the cover and the method further comprises: performing one or more depth measurements of a scene with the ToF sensor; determining, based on the one or more depth measurements of the scene, whether any photo-sensitive element of the light capturing element that is to be used for the at least one CM measurement is receiving light reflected from any object in the scene back to the ToF sensor; and, if no photo-sensitive element to be used for the at least one CM measurement is receiving light reflected from any object in the scene back to the ToF sensor, performing the at least one CM measurement for obtaining the measurement data.

In some examples, the at least one coded modulation measurement for obtaining the measurement data is performed in a sequence of depth measurements for obtaining a depth image.

Other examples relate to an apparatus for characterizing a ToF sensor and/or a cover covering the ToF sensor. The apparatus comprises a ToF sensor configured to perform at least one coded modulation measurement for obtaining measurement data for light reflected from the cover back to the ToF sensor. A measurement range of the ToF sensor is configured to end shortly after the cover for the at least one coded modulation measurement. The apparatus further comprises a processing circuit configured to determine characterization data based on the measurement data. The characterization data indicate a quantity related to the ToF sensor and/or the cover.

According to some examples, an illumination element of the ToF sensor for emitting light and a light capturing element of the ToF sensor for measuring the light reflected from the cover are arranged in a common cavity that is covered by the cover.

Examples of the present disclosure may provide a ToF reference measurement based on the reflection of a cover (glass).

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for characterizing a time-of-flight sensor and/or a cover covering the time-of-flight sensor, the method comprising:

performing at least one coded modulation measurement with the time-of-flight sensor for obtaining measurement data for light reflected from the cover back to the time-of-flight sensor, wherein a measurement range of the time-of-flight sensor is configured to end shortly after the cover for the at least one coded modulation measurement, wherein an illumination element of the time-of-flight sensor is configured to emit the light for the at least one coded modulation measurement based on an illumination signal having an alternating series of high and low pulses of varying duration, wherein electronic circuitry of a light capturing element of the time-of-flight sensor is configured to be driven for the at least one coded modulation measurement based on a reference signal having an alternating series of high and low pulses of varying duration;

determining characterization data based on the measurement data, wherein the characterization data indicate a quantity related to the time-of-flight sensor and/or the cover; and adjusting the pulse durations of the high and low pulses in the illumination signal and the reference signal and a time-shift between the illumination signal and the reference signal, to mitigate a response of the time-of-flight sensor to reflections of objects behind the cover for the at least one coded modulation measurement.

2. The method of claim 1, wherein the illumination element and the light capturing element are arranged in a common cavity that is covered by the cover.

3. The method of claim 1, wherein at least two coded modulation measurements are performed for obtaining the measurement data.

4. The method of claim 1, wherein the characterization data indicate a distance error correction value for correcting distance values determined based on depth measurements performed by the time-of-flight sensor, and wherein determining the characterization data comprises:

determining a measured distance of the cover to the time-of-flight sensor based on the measurement data; and determining the distance error correction value based on a comparison of the measured distance of the cover to the time-of-flight sensor to a known distance of the cover to the time-of-flight sensor.

5. The method of claim 4, further comprising:

correcting, using the distance error correction value, a distance value indicating a distance of the time-of-flight sensor to an object in a scene sensed by the time-of-flight sensor, wherein the distance value is determined based on depth measurements performed by the time-of-flight sensor.

6. The method of claim 1, wherein the characterization data indicate a measured output power of the illumination element.

7. The method of claim 6, further comprising:

generating, based on the characterization data, the illumination signal for controlling the illumination element of the time-of-flight sensor; and/or generating, based on the characterization data, the reference signal for driving the electronic circuitry of the light capturing element of the time-of-flight sensor for measuring the light reflected from the cover.

8. The method of claim 1, wherein the characterization data indicate a condition of the cover.

9. The method of claim 8, wherein the condition of the cover indicates at least one of the following: no foreign material present on the cover, presence of foreign material on the cover, presence of dirt on the cover, presence of a finger print mark on the cover, presence of fluid on the cover.

10. The method of claim 1, further comprising:

storing the characterization data in a memory together with temperature data indicating a temperature at the time-of-flight sensor during the at least one coded modulation measurement for obtaining the measurement data.

11. The method of claim 10, wherein in addition to the characterization data, further pieces of characterization data are stored in the memory, wherein each of the further pieces of characterization data is stored together with a respective piece of temperature data indicating a temperature at the time-of-flight sensor different from the temperature during the at least one coded modulation measurement for obtaining the measurement data, and wherein the method further comprises:

measuring a current temperature at the time-of-flight sensor;

selecting one of the characterization data and the further pieces of characterization data based on a comparison of the current temperature and the temperatures indicated by the pieces of temperature data stored in the memory together with the characterization data and the further pieces of characterization data; and operating the time-of-flight sensor using the selected one of the characterization data and the further pieces of characterization data.

12. The method of claim 1, further comprising:

performing one or more depth measurements of a scene with the time-of-flight sensor;

determining, based on the one or more depth measurements of the scene, whether any photo-sensitive element of the light capturing element that is to be used for the at least one coded modulation measurement is receiving light reflected from any object in the scene back to the time-of-flight sensor; and if no photo-sensitive element to be used for the at least one coded modulation measurement is receiving light reflected from any object in the scene back to the time-of-flight sensor, performing the at least one coded modulation measurement for obtaining the measurement data.

13. The method of claim 1, wherein the at least one coded modulation measurement for obtaining the measurement data is performed in a sequence of depth measurements for obtaining a depth image.

14. An apparatus for characterizing a time-of-flight sensor and/or a cover covering the time-of-flight sensor, the apparatus comprising:

a time-of-flight sensor configured to perform at least one coded modulation measurement for obtaining measurement data for light reflected from the cover back to the time-of-flight sensor, wherein a measurement range of the time-of-flight sensor is configured to end shortly after the cover for the at least one coded modulation measurement; and a processing circuit configured to determine characterization data based on the measurement data, wherein the characterization data indicate a quantity related to the time-of-flight sensor and/or the cover, wherein an illumination element of the time-of-flight sensor is configured to emit the light for the at least one coded modulation measurement based on an illumination signal having an alternating series of high and low pulses of varying duration, wherein electronic circuitry of a light capturing element of the time-of-flight sensor is driven for the at least one coded modulation measurement based on a reference signal having an alternating series of high and low pulses of varying duration, wherein the pulse durations of the high and low pulses in the illumination signal and the reference signal and a time-shift between the illumination signal and the reference signal are adjusted to mitigate a response of the time-of-flight sensor to reflections of objects behind the cover for the at least one coded modulation measurement.

15. The apparatus of claim 14, wherein the illumination element and the light capturing element are arranged in a common cavity that is covered by the cover.

* * * * *